United States Patent
Ebrahim-Zadeh et al.

(10) Patent No.: US 8,094,368 B2
(45) Date of Patent: Jan. 10, 2012

(54) OPTICAL PARAMETRIC OSCILLATOR (75) Inventors: Majid Ebrahim-Zadeh, Bracelona (ES); Masood Ghotbi, Berlin (DE)

(73) Assignees: Institut de Ciencies Fotoniques, Fundacio Privada, Castelldefels (ES); Institucio Catalana de Recerca I Estudis Avancats, Barcelona (ES)

( * ) Notice: Subject to any disclaimer, the term of this patent is extended or adjusted under 35 U.S.C. 154(b) by 278 days.

(21) Appl. No.: 12/300,940

(22) PCT Filed: May 15, 2007

(86) PCT No.: PCT/GB2007/001783
§ 371 (c)(1), (2), (4) Date: Mar. 4, 2009

(87) PCT Pub. No.: WO2007/132229
PCT Pub. Date: Nov. 22, 2007

(65) Prior Publication Data
US 2010/0060976 A1 Mar. 11, 2010

(30) Foreign Application Priority Data
May 15, 2006 (GB) .................................. 0609599.6

(51) Int. Cl.
G02F 1/355 (2006.01)
G02F 1/39 (2006.01)
G02F 1/37 (2006.01)
(52) U.S. Cl. .......................... 359/330; 359/328; 372/105
(58) Field of Classification Search .......... 359/326–332; 372/21, 22, 97, 98, 105; 385/122
See application file for complete search history.

(56) References Cited

U.S. PATENT DOCUMENTS
5,017,806 A 5/1991 Edelstein et al.
(Continued)

FOREIGN PATENT DOCUMENTS
DE 101 06 517 A1 8/2002
(Continued)

OTHER PUBLICATIONS
D.C. Edelstein et al., Applied Physics Letters 54, p. 1728 (1989).
(Continued)

*Primary Examiner* — Daniel Petkovsek
(74) *Attorney, Agent, or Firm* — Harness, Dickey & Pierce, P.L.C.

(57) ABSTRACT

A synchronously-pumped optical parametric oscillator (OPO 10) driven by the second harmonic output of a Kerr-lens-mode-locked Ti:sapphire laser (12) generates femtosecond pulses with wide tunability in the visible and ultraviolet spectrum. The OPO uses bismuth triborate, $BiB_3O_6$ (or BIBO) or a substituted form thereof, in collinear critical phase-matching as the nonlinear gain crystal (24). Using simple crystal rotation at room temperature, a continuous tuning range from 480 nm to 710 nm is achieved with a single BIBO crystal (24) and a single set of mirrors (26, 28, 30) for the OPO cavity. The OPO (10) generates up to 27 OmW of average power across the available tuning range and can deliver femtosecond pulses at a repetition rate of 76 MHz. Frequency doubling of the visible signal pulses from the OPO (10) is also achieved in the crystal of $\beta\text{-}BaB_2O_4$, external and internal to the OPO resonator (10), providing femtosecond pulses with wide tunability in the 235 nm to 355 nm in the ultraviolet at average powers of up to 100 mW.

14 Claims, 12 Drawing Sheets

U.S. PATENT DOCUMENTS

| | | | |
|---|---|---|---|
| 5,053,641 | A | 10/1991 | Cheng et al. |
| 5,296,960 | A | 3/1994 | Ellingson et al. |
| 5,377,043 | A | 12/1994 | Pelouch et al. |
| 5,406,408 | A | 4/1995 | Ellingson et al. |
| 5,579,152 | A | 11/1996 | Ellingson et al. |
| 5,594,592 | A | 1/1997 | Harlamoff et al. |
| 5,847,861 | A | 12/1998 | Kafka et al. |
| 6,233,025 | B1 | 5/2001 | Wallenstein |
| 6,264,858 | B1 | 7/2001 | Bohaty et al. |
| 2006/0114946 | A1* | 6/2006 | Sun et al. ................ 372/22 |

FOREIGN PATENT DOCUMENTS

| | | |
|---|---|---|
| WO | WO-00/72411 A | 11/2000 |
| WO | WO-2004107034 | 12/2004 |

OTHER PUBLICATIONS

M. Ebrahimzadeh, Solid-State Mid-Infrared Laser Sources, Topics in Applied Physics 89, p. 179-218 (2003).

R. J. Ellingson and C. L. Tang, Optics Letters 18, p. 438 (1993).

D. T. Reid et al., Journal of the Optical Society of America B 12, p. 1157 (1995).

T. J. Driscoll et al., Optics Communications 110, p. 638 (1994).

T. J. Driscoll, G.M. Gale, F. Hache: "Ti:sapphire second-harmonic-pumped visible range femtosecond optical parametric oscillator" Optics Communications, vol. 110, Sep. 1, 1994, pp. 638-644.

Reid et al "Efficient femtosecond pulse generation in the visible in a frequency-doubled optical parametric oscillator based on $RbTiOAsO_4$", Journal of the Optical Society of America B (1995) pp. 1157-1163.

M. Ghotbi, M. Ebrahim-Zadeh, a Majchrowski, E. Michalski, I.V. Kityk, "High-average-power femtosecond pulse generation in the blue using $BiB_3O_6$" Opt. Lett, 29, 2530-2532 (2004).

M. Ghotbi and M. Ebrahim-Zadeh, "Optical second harmonic generation properties of $BiB_3O_6$" Opt. Exp 12, 6002-6019 (2004).

M. Ebrahim-Zadeh, and M. Ghotbi, "High-Power, Widely Tunable Femtosecond Optical Parametric Oscillator for the Visible and Ultraviolet", Conference on Lasers and Electro-Optics (CLEO) paper: CPDA2 (2006).

Peltz et al., Bismuth triborate (BiB3O6) optical parametric oscillators, Appl. Phys. B 80, 55-60 (2005).

* cited by examiner

OPTICAL PARAMETRIC OSCILLATOR

CROSS-REFERENCE TO RELATED APPLICATIONS

This application is a 371 U.S. National Stage of International Application No. PCT/GB2007/001783, filed May 15, 2007 and published in English as WO 2007/132229 on Nov. 22, 2007. This application claims the benefit of United Kingdom Patent Application No. 0609599.6, filed May 15, 2006. The disclosures of the above applications are expressly incorporated herein by reference.

The present invention relates to a type of ultrafast optical parametric oscillator (OPO) capable of producing high-repetition-rate femtosecond or picosecond pulses with wide tunability in the visible and ultraviolet (UV).

Such femtosecond or picosecond pulses have utility in a wide range of scientific and technological applications including time-resolved spectroscopy in semiconductor physics, biophotonics, photochemistry, and nanotechnology. The benefit of such a short duration for the pulses is to provide a high degree of time-resolution. However, few types of laser are capable of producing such short pulses. The choice of laser reduces as the duration of the required pulse decreases. Any given laser will have certain operational characteristics, for example the wavelength-tuning range and the output power. The restricted choice of laser in turn restricts the nature of the pulses which it is possible to produce. For example, to produce femtosecond pulses of, say, 500 fs or below, currently the primary practical laser available is a Ti:sapphire laser.

In many applications it is desirable to tune pulses over different wavelengths, for example to study different physical phenomena. The wavelength-tuning ranges of available lasers are generally limited. For example, the wavelength-tuning range of a Ti:sapphire laser is typically 700 nm to 1000 nm.

To achieve pulses having a wavelength outside the tuning range of a laser, one known technique is to use the laser to pump an OPO incorporating a nonlinear optical crystal in an oscillator cavity to generate signal and idler pulses from the pump pulses produced by the laser. Due to conservation of energy in the operation of an OPO, the signal and idler pulses both have a lower energy and frequency, and therefore a longer wavelength, than the original pump pulses provided by the laser. This means that an OPO does not allow the generation of pulses of shorter wavelengths than the pump pulses.

For example, since the first demonstration of Ti:sapphire laser-pumped femtosecond OPO given in D. C. Edelstein et al., Applied Physics Letters 54, page 1728 (1989), a variety of devices based on this concept have been developed. Because of the tuning range of the Ti:sapphire pump laser, the spectral coverage of the vast majority of femtosecond OPOs developed to date has been confined to the near-infrared (near-IR) and mid-infrared (mid-IR) region, at wavelengths between approximately 1 µm and 5 µm (see, for example, M. Ebrahimzadeh, Solid-State Mid-Infrared Laser Sources, Topics in Applied Physics 89, page 179-218 (2003)). Due to the absence of practical alternative femtosecond pump sources at wavelengths below 700 nm, the development of femtosecond OPOs for the visible and UV spectral range has been difficult. Combined with a lack of suitable nonlinear gain crystals, this has hampered the generation of high-repetition-rate femtosecond pulses in important spectral regions in the visible and UV.

To provide high-repetition-rate femtosecond pulses in the difficult spectral regions in the visible, two prior art methods have been disclosed as follows.

The first prior art method, disclosed in R. J. Ellingson and C. L. Tang, Optics Letters 18, page 438 (1993); D. T. Reid et al., Journal of the Optical Society of America B 12, page 1157 (1995), is pumping of a femtosecond near-IR OPO directly with a Kerr-lens-mode-locked (KLM) Ti:sapphire laser and subsequent conversion of the near-IR signal pulses from OPO into the visible using second harmonic generation internal to the OPO cavity. Such systems have relied on $KTiOPO_4$ (KTP) or its arsenate isomorph, $RbTiOAsO_4$ (RTA), as the OPO gain element, and $\beta\text{-}BaB_2O_4$ as the second harmonic crystal. Because of the limited tuning capability of KTP and RTA, the visible signal pulses from these OPOs cover a confined spectral range of only about 80 nm in the visible from approximately 580 nm to 660 nm.

The second prior art method, disclosed in D. J. Driscoll et al., Optics Communications 110, page 638 (1994), is to first frequency-double the output of a KLM femtosecond Ti:sapphire laser into the blue spectral range using the crystal of $\beta\text{-}BaB_2O_4$, and then use this radiation to directly pump a visible femtosecond OPO based on a second $\beta\text{-}BaB_2O_4$ crystal in a non-collinear geometry between the pump and the OPO signal beam. Using this method, visible femtosecond pulses over a limited range of 566 nm to 676 nm have been generated at average output powers of up to 100 mW.

Although these two prior art method have enabled the generation of high-repetition-rate femtosecond pulses in the visible spectrum with wavelength-tuning from 566 nm to 676 nm, there remains a need for femtosecond OPOs to cover the remaining spectral gaps in the visible and UV.

According to the present invention, there is provided an optical parametric oscillator, comprising:

a laser pump source operable to provide pump pulses of light of wavelength in the range from 300 nm to 475 nm, which pump pulses are of a duration of at most 1 ns and at a predetermined repetition rate of at least 0.1 MHz;

an oscillator cavity including a first focus;

a nonlinear optical crystal comprising either (a) $BiB_3O_6$ or (b) $Bi_{1-x}M_xB_3O_6$ where M is Ga, In, Sc or one of the rare earth elements and $0<x\leq0.5$, in a collinear phase-matching configuration, located at the focus of said oscillator cavity;

the laser pump source being located external to the oscillator cavity and arranged to direct the pump pulses through said crystal to synchronously pump said crystal and thereby cause the crystal to generate signal pulses and idler pulses from the pump pulses, the oscillator cavity being arranged to direct the signal pulses along the cavity and to output pulses derived from the signal pulses.

As compared to the OPOs using the two prior art methods set out above, the OPO in accordance with the present invention provides a wider wavelength-tuning range and enhanced operational characteristics. These advantages arise from the use of the material $BiB_3O_6$ or a substituted form thereof as the nonlinear optical crystal combined with the provision of the crystal in a collinear phase-matching configuration. The crystal may comprise pure $BiB_3O_6$. Alternatively, the crystal may have a proportion x of the Bi atoms substituted by Ga, In, Sc or one of the rare earth elements. Such a substituted form of $BiB_3O_6$ provides similar crystal properties. Hereinafter, the term BIBO will be used to cover both $BiB_3O_6$ and the substituted form thereof.

The material BIBO in itself has advantageous properties which lead to a wide wavelength-tuning range, examples of which are given below. In addition, it has been appreciated by the present inventors that it is possible to use the material BIBO in a collinear phase-matching configuration with the result of improving the operational characteristics by providing a higher overall gain and also improving the ease of alignment of the crystal and of the oscillator cavity.

The laser pump source provides pump pulses of light of wavelength in the range from 300 nm to 475 nm, which pump pulses are of a duration of at most 1 ns and at a predetermined repetition rate of at least 0.1 MHz. However, in practice low repetition rates require relatively long OPO cavity lengths with correspondingly more cumbersome designs. Accordingly, in practical embodiments the predetermined repetition rate is typically at least 1 MHz.

To generate the pump pulses of the desired characteristics, the laser pump source may comprise a laser operable to output laser pulses of light of wavelength in the range from 600 nm to 1500 nm and a further nonlinear optical crystal, in a harmonic generation configuration, arranged to receive the laser pulses and to generate said pump pulses from said laser pulses at a harmonic of said laser pulses. Thus the pump pulses generated by the further nonlinear optical crystal are at a harmonic of the laser pulses and so have a wavelength equal to the wavelength of the laser pulses divided by an integer. Most conveniently, second harmonic generation is used so the pump pulses have a wavelength equal to half the wavelength of the laser pulses.

The laser may be a Ti:sapphire laser which has the benefit of allowing the generation of femtosecond pulses having a duration of 500 fs or less. However, in principle any type of laser capable of producing laser pulses with a wavelength in the range from 600 nm to 1500 nm of appropriate duration and rate may be used, for example but without limitation a Nd-doped or Yb-doped solid state crystalline laser, any type of fibre laser, or any type of hybrid fibre-based system such as one comprising a fibre and another solid-state crystalline laser.

Advantageously, the further nonlinear optical crystal comprises either (a) $BiB_3O_6$ or (b) $Bi_{1-x}M_xB_3O_6$ where M is Ga, In, Sc or one of the rare earth elements and $0<x\leq0.5$.

To illustrate the wide wavelength-tuning range, some types of embodiment will be described.

In a first type of embodiment, the oscillator cavity is arranged to output a proportion of the power of the signal pulses as said output pulses, whereby the output pulses have the wavelength of the signal pulses generated by the nonlinear optical crystal. In an actual embodiment of this type in which the laser pump source was the second harmonic output of a Kerr-lens-mode-locked (KLM) Ti:sapphire laser in the blue, generated in the crystal of bismuth triborate, $BiB_3O_6$, there was observed generation of femtosecond pulses in the visible, with demonstrated tuning from 480 nm to 710 nm, and potential tunability from 450 nm to 800 nm. Importantly, this range covers the difficult region of 500 nm to 700 nm not accessible by frequency doubling of the Ti:sapphire laser itself. Practical average output powers of up to 270 mW are produced across the available tuning range, in pulses of between 100 fs and 175 fs duration at a repetition rate of 76 MHz.

In a second type of embodiment, the oscillator cavity further includes a second focus, the optical parametric oscillator further comprises a second nonlinear optical crystal located at said second focus of said cavity, in a second-harmonic generation configuration, the second nonlinear optical crystal being arranged to generate second-harmonic pulses from the signal pulses, the oscillator cavity is arranged to output at least a proportion of the power of the second-harmonic pulses as said output pulses, whereby the output pulses have the wavelength of half the wavelength of the signal pulses.

In an actual embodiment of this type in which the laser pump source was the second harmonic output of a Kerr-lens-mode-locked (KLM) Ti:sapphire laser in the blue, generated in the crystal of bismuth triborate, $BiB_3O_6$ and in which the second nonlinear optical crystal was $\beta$-$BaB_2O_4$ (BBO), there was observed conversion of femtosecond visible signal pulses from the OPO into the UV spectral range by internal or external second harmonic generation in the second nonlinear optical crystal. This provided femtosecond pulses with demonstrated tuning from 235 nm to 355 nm, and potential tuning from 225 nm to 400 nm. Importantly, this range covers the difficult spectral range of 320 nm to 355 nm not accessible by frequency tripling of the Ti:sapphire laser and, additionally, at substantially increased output powers. Practical average output powers of up to 100 mW are generated across the available tuning range at 76 MHz pulse repetition rate.

The second nonlinear optical crystal may alternatively be of a different material from $\beta$-$BaB_2O_4$, for example $LiB_3O_5$ or KDP.

Embodiments of the present invention will now be described by way of non-limitative example with reference to the accompanying drawings, in which.

Figure 1:
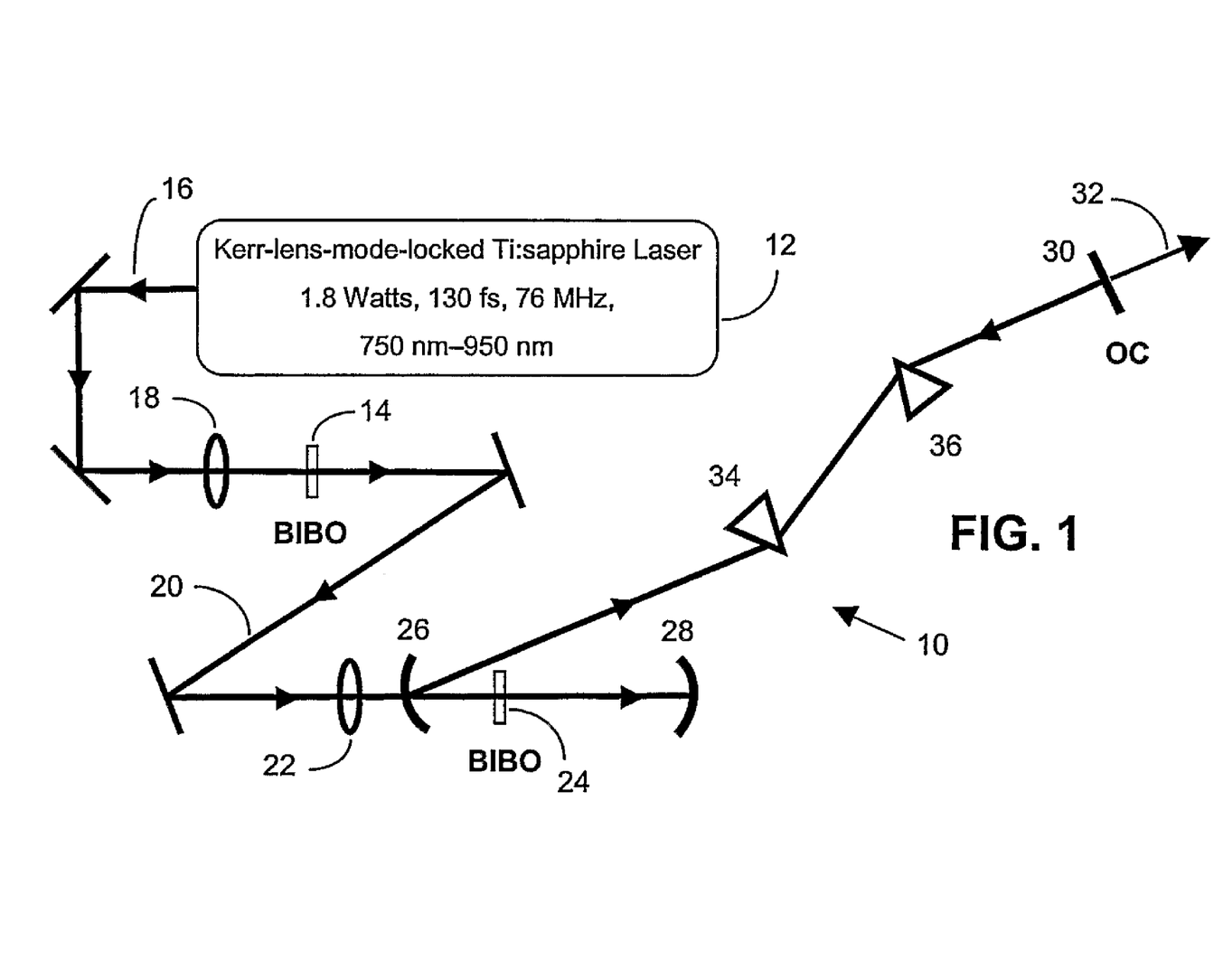
FIG. 1 is a diagram of an OPO of a first type.

An OPO 10 of a first type is illustrated in FIG. 1 in a diagrammatic form. The OPO 10 is pumped by the second harmonic of a Kerr-lens-mode-locked Ti:sapphire laser 12 (Coherent, Mira 900) as the fundamental source. The laser 12 delivers laser pulses 16 with a duration of 130 fs at a repetition rate of 76 MHz, with an average power of up to 1.8 W over a tunable range 750 nm to 950 nm.

Second harmonic generation of pump pulses 20 from the laser pulses 16 is achieved in a 1-mm nonlinear optical crystal 14 of BIBO, that is either (a) $BiB_3O_6$ or (b) $Bi_{1-x}M_xB_3O_6$ where M is Ga, In, Sc or one of the rare earth elements and $0<x\leq0.5$, cut for collinear critical type I (e+e→o) phase-matching in yz plane) ($\phi$=90° at internal angles close to $\theta$=152° at normal incidence. A convex lens 18 focuses the fundamental beam of the laser pulses 16 to a focus with a beam waist radius $w_0$ of 50 μm, the crystal 14 is arranged at the focus and so receives the laser pulses. As an alternative, the crystal 14 may be cut at Brewster's angle.

The crystal 14 is in a second-harmonic generation configuration so that pump pulses 20 are generated from the laser pulses 16 at the second harmonic of the laser pulses 16. The surface of the convex lens 18 is anti-reflection coated for the fundamental Ti:sapphire wavelengths and the faces of crystal 14 are anti-reflection coated for both fundamental and second harmonic wavelengths to maximise the generated power in the blue beam of the pump pulses 20. With this arrangement, an average output power of up to 1 W is generated in the blue beam of the pump pulses 20 at greater than 50% conversion efficiency over a tunable range of 375 nm to 435 nm. The blue pump pulses 20 have durations of 200 fs.

The generated blue beam of the pump pulses 20 is then collimated and focussed, using a convex lens 22, to a focus with a beam waist radius $w_0$ of 25 μm. Thus the components described above including the laser 12 and crystal 14 constitute a laser pump source for the pump pulses 20.

A nonlinear optical crystal 24 of BIBO, that is either (a) $BiB_3O_6$ or (b) $Bi_{1-x}M_xB_3O_6$ where M is Ga, In, Sc or one of the rare earth elements and $0<x\leq0.5$, is arranged at the focus of the convex lens 22 and so receives the pump pulses 20. The crystal 24 is the nonlinear gain element for the synchronously-pumped OPO 10. In this arrangement, the OPO 10 comprises a three-mirror standing-wave oscillator cavity (or resonator) formed by concave high-reflector mirrors 26, 28 and by a plane output coupler (OC) mirror 30.

The two concave high-reflector mirrors 26, 28, each have a radius of curvature r=10 cm, and have a common focus which is coincident with the focus of the convex lens 22 and at which the crystal 24 is located. The mirrors 26, 28 are highly reflecting for resonant signal wavelengths of signal pulses generated in the crystal 24 as described below between 470 nm and 710 nm, and highly transmitting for the blue beam of pump pulses 20 between 375 nm and 435 nm. The crystal 24 is 500 μm thick and has a collinear critical phase matching configuration, being cut for collinear critical type I (e+e→o) phase-matching in yz plane) (φ=90° at internal angles close to θ=159° at normal incidence. The end-faces of the crystal 24 are anti-reflection coated over the wavelength range of the signal pulses of 470 nm to 710 nm. The end-faces of the crystal 24 are also highly transmitting over the wavelength range of the pump pulses 20 between 375 nm and 435 nm. As an alternative, the crystal 24 may be cut at Brewster's angle.

In this configuration, the crystal 24 generates signal pulses and idler pulses from the pump pulses 20. The signal pulses and idler pulses resonate in the cavity formed by the mirrors 26, 28, 30. The length of the cavity is adjusted relative to the repetition rate of the pump pulses 20 such that the pump pulses 20 are synchronous with the resonating signal pulses.

The oscillator cavity 10 is completed by the plane output coupler (OC) mirror 30, through which a proportion of the power of the signal pulses is extracted to constitute the OPO signal beam of output pulses 32.

The crystals 14 and 24 may each be either (a) $BiB_3O_6$ or (b) $Bi_{1-x}M_xB_3O_6$ where M is Ga, In, Sc or one of the rare earth elements and $0<x\leq0.5$. Pure $BiB_3O_6$ provides advantageous optical crystal properties. Similar properties may be achieved in the substituted form $Bi_{1-x}M_xB_3O_6$ where a proportion x of the Bi atoms are substituted by Ga, In, Sc or one of the rare earth elements. Of course, the BIBO may include impurities at a level which do not significantly degrade the optical properties. Such BIBO material in its pure and substituted form and its method of manufacture are disclosed in U.S. Pat. No. 6,264,858 although not in the context of a collinear critical phase matching configuration in an OPO.

The cavity formed between the mirrors 26, 28, 30 accommodates two fused silica prisms, 34, 36, providing intracavity dispersion compensation. Other materials having a negative group velocity dispersion could also be used. As an alternative, it would be possible to provide dispersion compensation by means of the mirrors 26, 28, 30 being chirped, or by means external to the oscillator cavity.

Alignment of the OPO 10 is first achieved, without prisms 34 and 36 in the cavity, simply by using the blue pump beam of pump pulses 20 as the pilot light. The two prisms 34, 36 are then inserted into the cavity and aligned using a continuous-wave (cw) He—Ne laser, and oscillation is re-gained.

Figure 3:
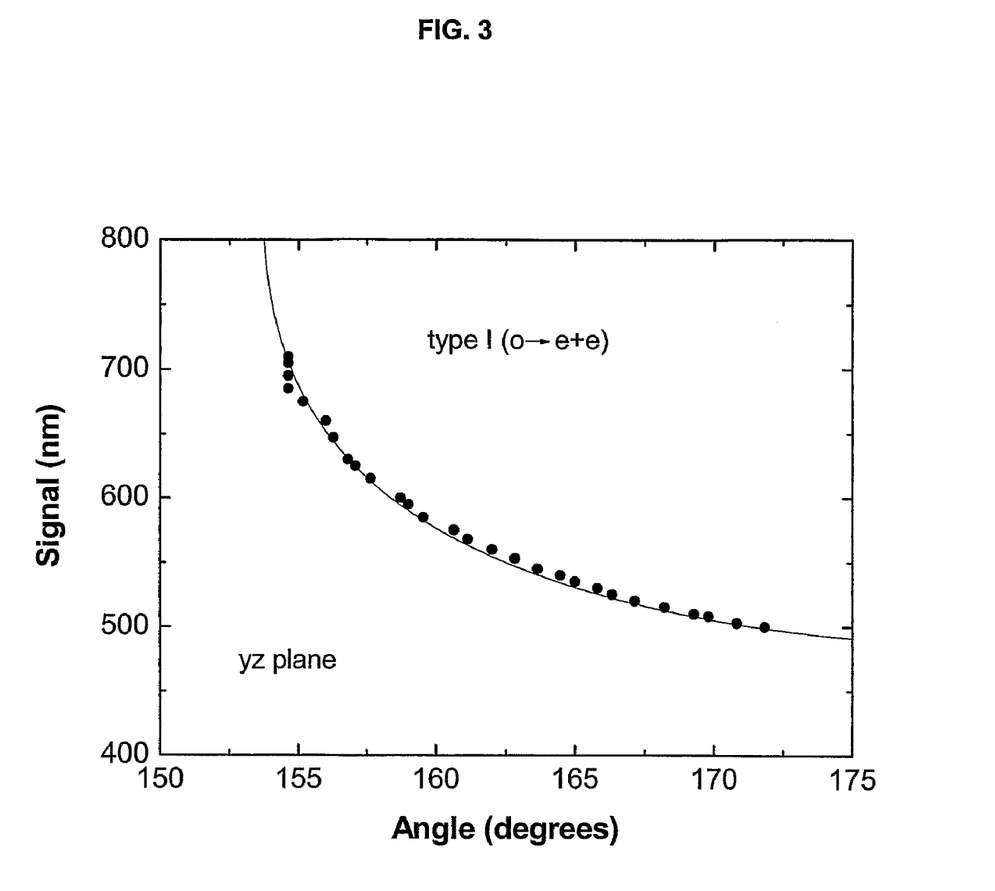
FIG. 3 is a graph illustrating the spectral tuning range of the oscillator of FIG. 1 as a function of BIBO crystal phase-match angle.
Figure 4:
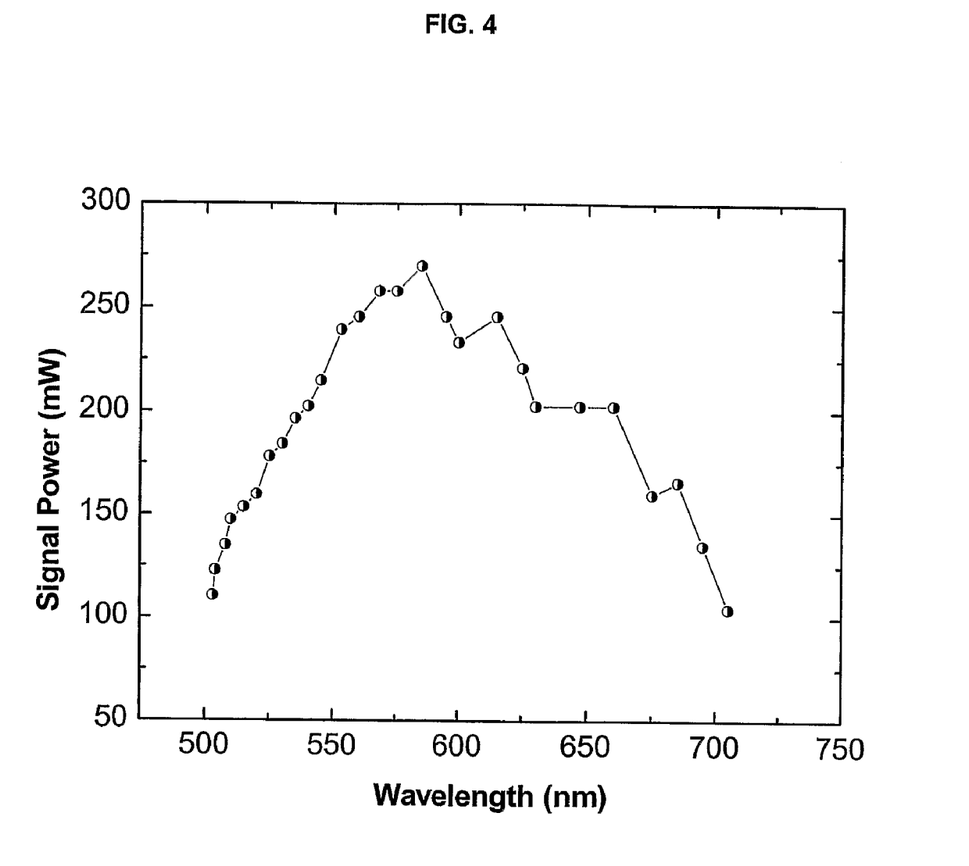
FIG. 4 is a graph illustrating the visible signal power generated by the oscillator of FIG. 1 as a function of signal wavelength tuning range.

The OPO 10 of FIG. 1, in the case that both the crystal 14 and the crystal 24 are $BiB_3O_6$, was operated experimentally with the following results. The variation with wavelength of average output power in the output signal beam of output pulses 32 at a pulse repetition rate of 76 MHz in the visible spectrum, for 1 W of power in the blue pump beam of pump pulses 20 is shown in FIG. 4, the average output power being up to 270 mW. When pumped at 410 nm or at 415 nm in the blue, a signal wavelength-tuning range from 480 nm to 710 nm was achieved at room temperature through simple rotation of the crystal to change the internal phase-match angle φ between 173° and 154° in the optical yz plane, as shown in FIG. 3 which is a graph illustrating the spectral tuning range of the oscillator of FIG. 1 as a function of BIBO crystal phase-match angle under type I (o→e+e) phase-matching in the optical yz-plane at a pump wavelength of 415 nm.

An additional wavelength tuning mechanism is also available at a given phase-match angle through variation of the length of the oscillator cavity formed between the mirrors 26, 28, 30, for example by movement of the OC mirror 30, which can be implemented manually or using a piezoelectric transducer. The extent of cavity length tuning is dependent on the signal pulse wavelength, but at a given wavelength, one can typically obtain 20 nm of fine tuning for up to 100 μm variation in the cavity length.

Figure 5:
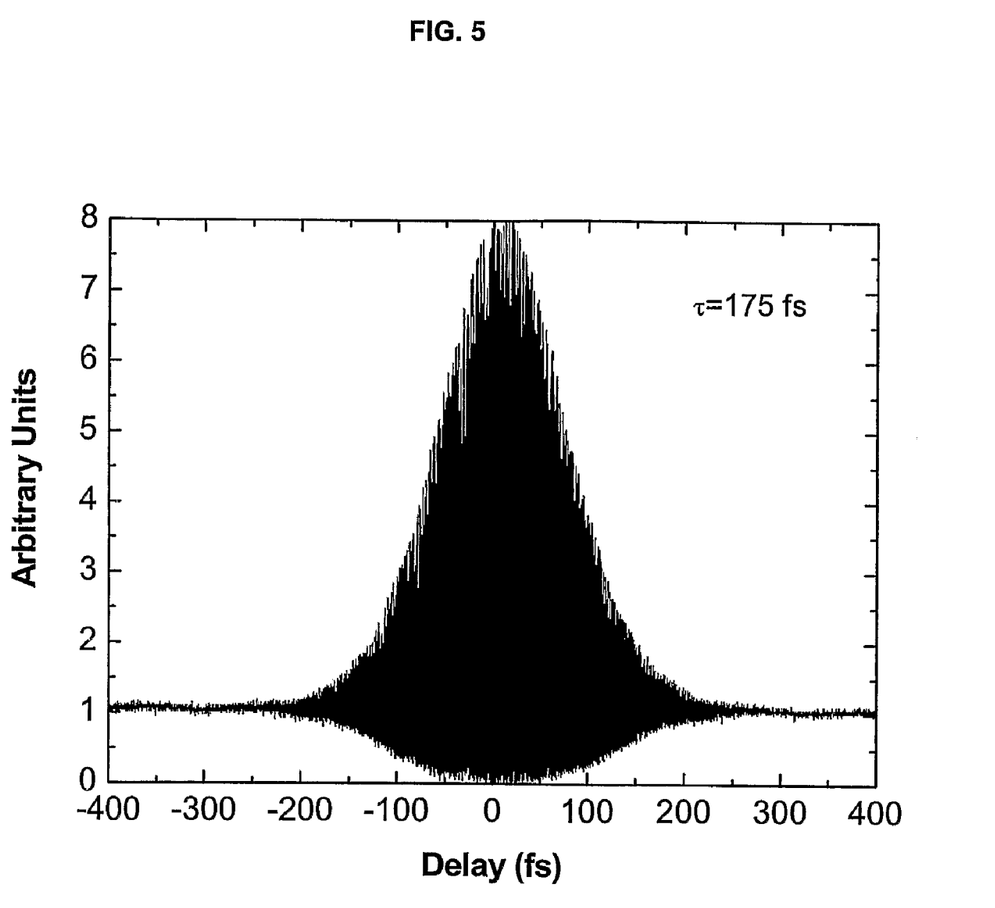
FIG. 5 is a real-time autocorrelation oscilloscope trace of the visible signal output of the oscillator of FIG. 1.

Wavelength tuning can also be achieved by variation of the wavelength of the pump pulses 20 in the 375 nm to 475 nm range. The generated output pulses 32 have a duration of 175 fs and are shown in FIG. 5 which is a real-time autocorrelation oscilloscope trace of the visible signal output of the oscillator of FIG. 1 at a wavelength of 628 nm.

It was also found that although neither the cavity length nor the temperatures of the crystals 14 and 24 were actively stabilized, the OPO 10 exhibited excellent stability at room temperature, with typically 2% peak-to-peak fluctuation in output power.

Figure 2:
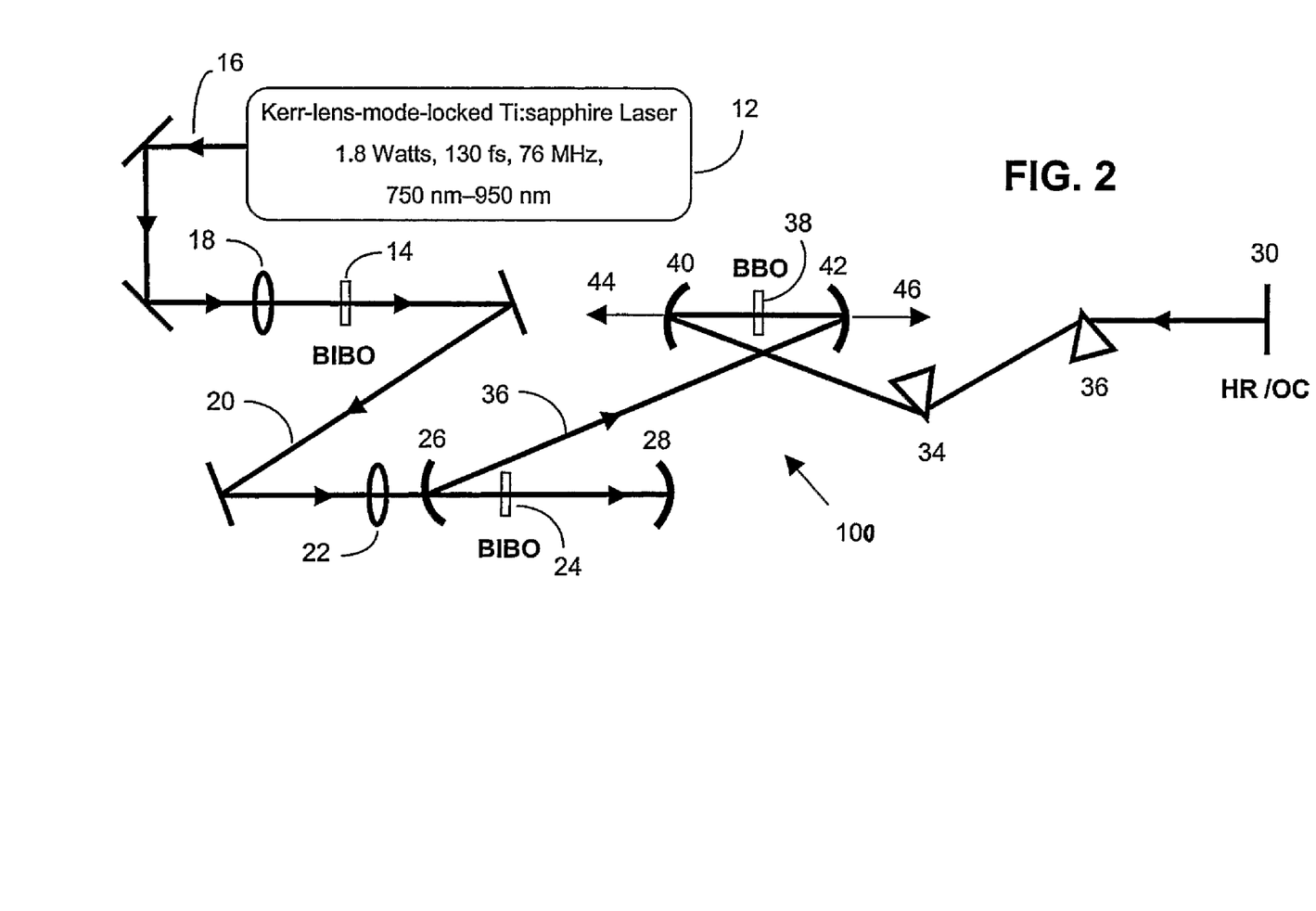
FIG. 2 is a diagram of an OPO of a second type.

An OPO 100 of a second type is illustrated in FIG. 2 in a diagrammatic form. The OPO 100 of FIG. 2 is a modified form of the OPO 10 of FIG. 1. Common elements are given the same reference numerals and a description thereof is not repeated. The modifications will now be described.

The OPO 100 is pumped by the same laser pump source and with the same pump beam characteristics as the OPO 10, the laser pump source including the Kerr-lens-mode-locked Ti:sapphire laser 12 and the crystal 14 for second harmonic generation. The crystal 14 generates signal pulses and idler pulses from the pump pulses 20 as described above.

In the OPO 100, the optical cavity is formed in part by the concave mirrors 26, 28 in the same configuration as the OPO 10 with the crystal 24 of BIBO at the focus thereof. However, the optical cavity is modified by being further formed by concave high-reflector mirrors 40, 42 and by a plane high-reflector mirror 30, instead of by the OC mirror 30. Thus in this case the optical cavity is a five-mirror standing-wave resonator.

The two additional concave high-reflector mirrors 40, 42, define a second intracavity focus for the OPO resonant signal pulses 36. At this second focus, there is located a second nonlinear crystal 38 in a second harmonic generation configuration. In experimental example, the material of the crystal 38 was β-BaB$_2$O$_4$ but any other suitable material could be used, for example LiB$_3$O$_5$ or KDP. The crystal is 500 μm thick, and in a collinear phase matching configuration, being cut for collinear critical type I (o+o→e) phase-matching at internal angles close to φ=42° at normal incidence. The end-faces of the crystal 38 have anti-reflection coatings from 470 nm to 710 nm with low transmission loss for second harmonic wavelengths between 235 nm and 355 nm. As an alternative, the crystal 38 may be cut at Brewster's angle.

The crystal 38 is in a second-harmonic generation configuration so that output pulses 44, 46 are generated from the signal pulses 36 at the second harmonic of the signal pulses 36. The concave mirrors 40, 42 are highly reflecting for resonant signal wavelengths between 470 nm and 710 nm and highly transmitting for second harmonic wavelengths between 235 nm and 355 nm, with the result that all or a proportion of the power of the output pulses 44, 46 is output through the concave mirrors 40, 42.

The oscillator cavity is completed by the plane mirror 34 which is a high reflector (HR) or alternatively a partial output coupler (OC) for the signal wavelengths between 470 nm and 710 nm.

The oscillator cavity formed by the mirrors 26, 28, 30, 32, 34 accommodates the two fused silica prisms 34, 36 providing intracavity dispersion compensation.

Alignment of the OPO is first achieved, without the prisms 34, 36 in the cavity, simply by using the blue pump beam of pump pulses 20 as the pilot light. The crystal 38 is inserted into the cavity and the oscillator cavity length is re-adjusted to regain oscillation. Finally, the two prisms 34, 36 are inserted into the oscillator cavity and aligned using a cw He—Ne laser, and oscillation is re-established.

Figure 9:
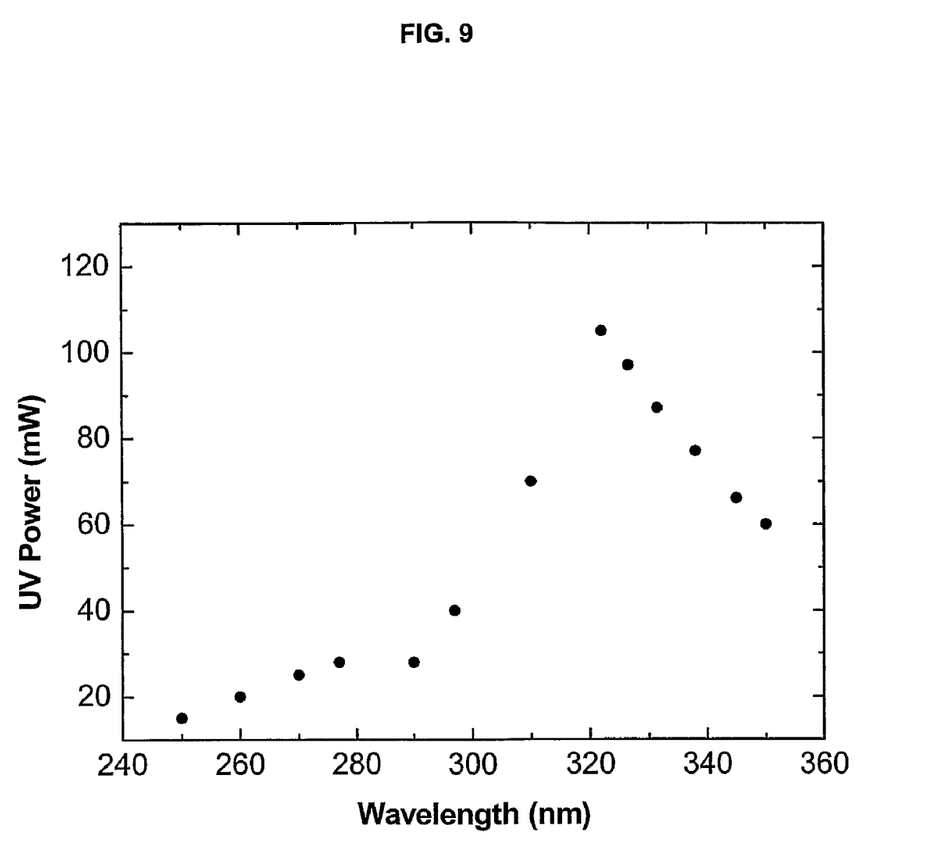
FIG. 9 is a graph illustrating the UV signal power generated by the OPO of FIG. 2 as a function of wavelength.

The OPO 100 of FIG. 2, in the case that both the crystal 14 and the crystal 24 are BiB$_3$O$_6$, was operated experimentally with the plane mirror 34 as a high reflector (HR) and the following results were obtained. FIG. 9 is a graph illustrating the UV signal power generated by the OPO 100 of FIG. 2 as a function of wavelength. The OPO 100 emitted up to 50 mW of average output power in the UV from each beam of the output pulses 44, 46 from the respective concave mirrors 40, 42 for nearly 1 W of power in the blue pump beam of pump pulses 20 at a pulse repetition rate of 76 MHz. Thus, the total generated UV power was 100 mW.

Wavelength tuning was accomplished by first varying the OPO visible signal wavelength through angular rotation of the crystal 24, or by changing the oscillator cavity length, and then re-adjusting the phase-matching angle for frequency doubling by rotating the crystal 38. When pumped at 410 nm, a wavelength tuning range from 235 nm to 355 nm was achieved at room temperature through simultaneous rotation of the crystal 24 and the crystal 38. The OPO 100 again exhibited excellent output stability at room temperature, without any active stabilization of the oscillator cavity length or the temperature of the two crystals 24, 38. A passive peak-to-peak fluctuation of approximately 2% in optical output power was observed.

Figure 10:
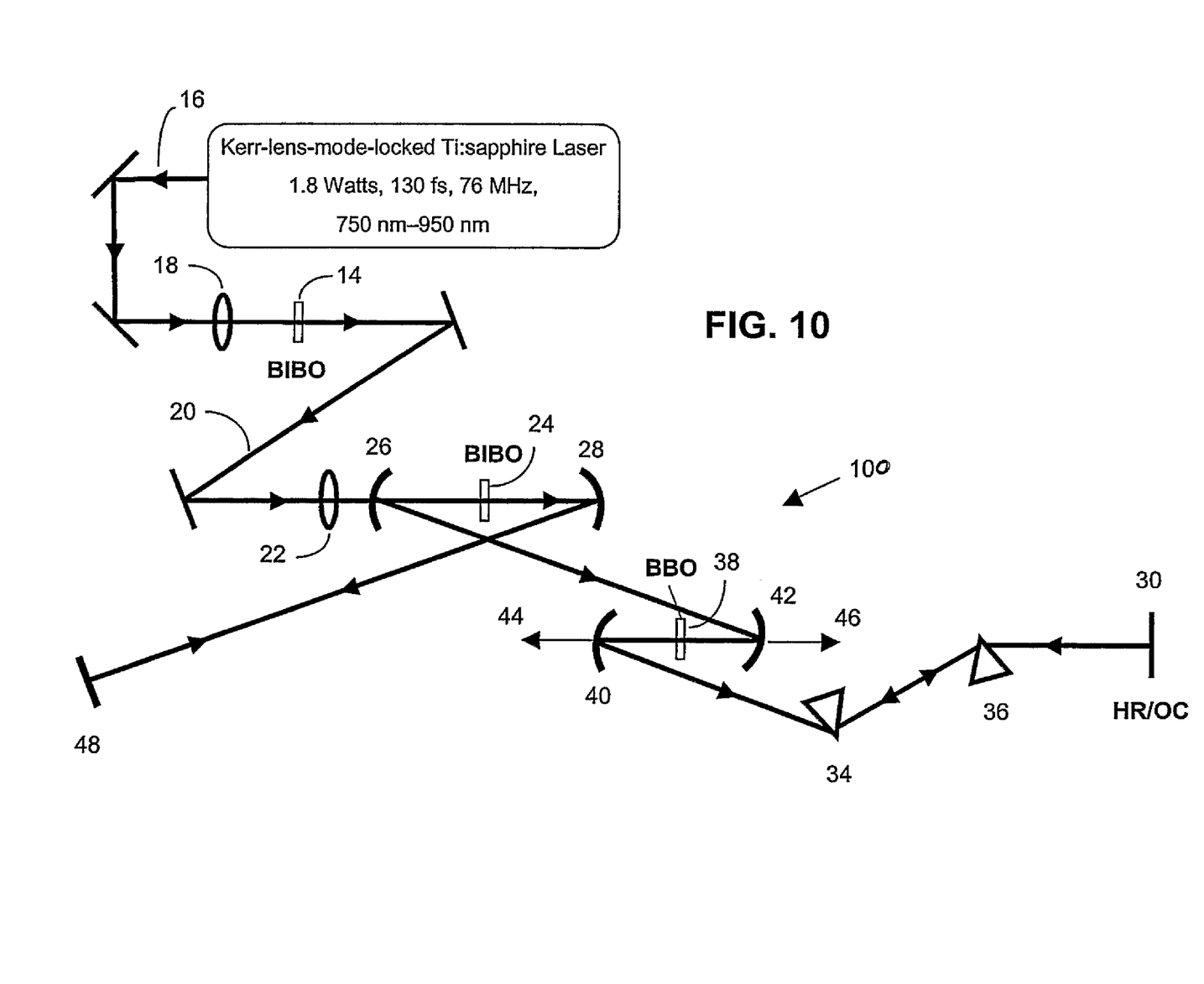
FIG. 10 is a diagram of an OPO of the second type with a modified oscillator cavity.
Figure 11:
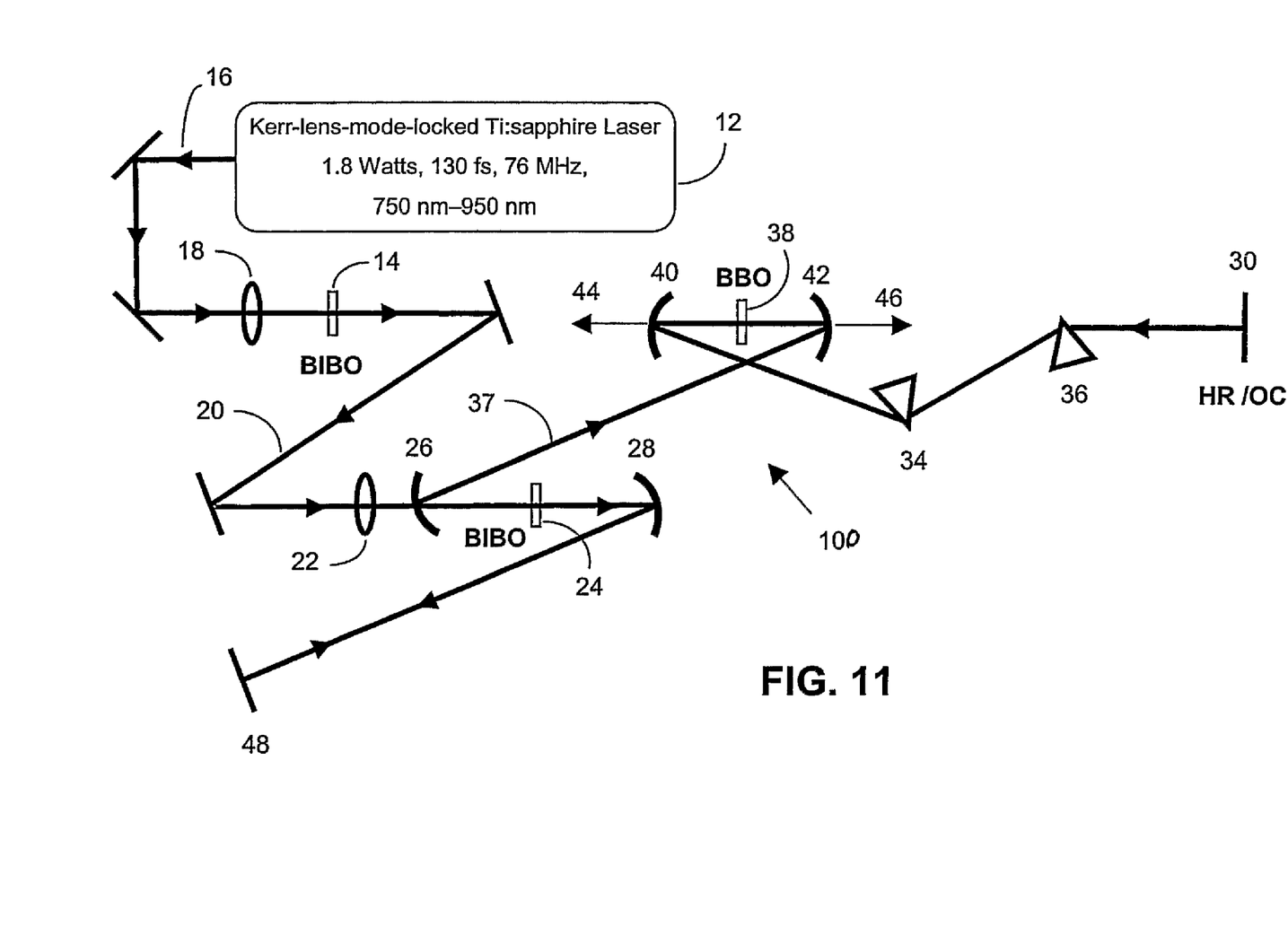
FIG. 11 is a diagram of an OPO of the second type with a modified oscillator cavity.
Figure 12:
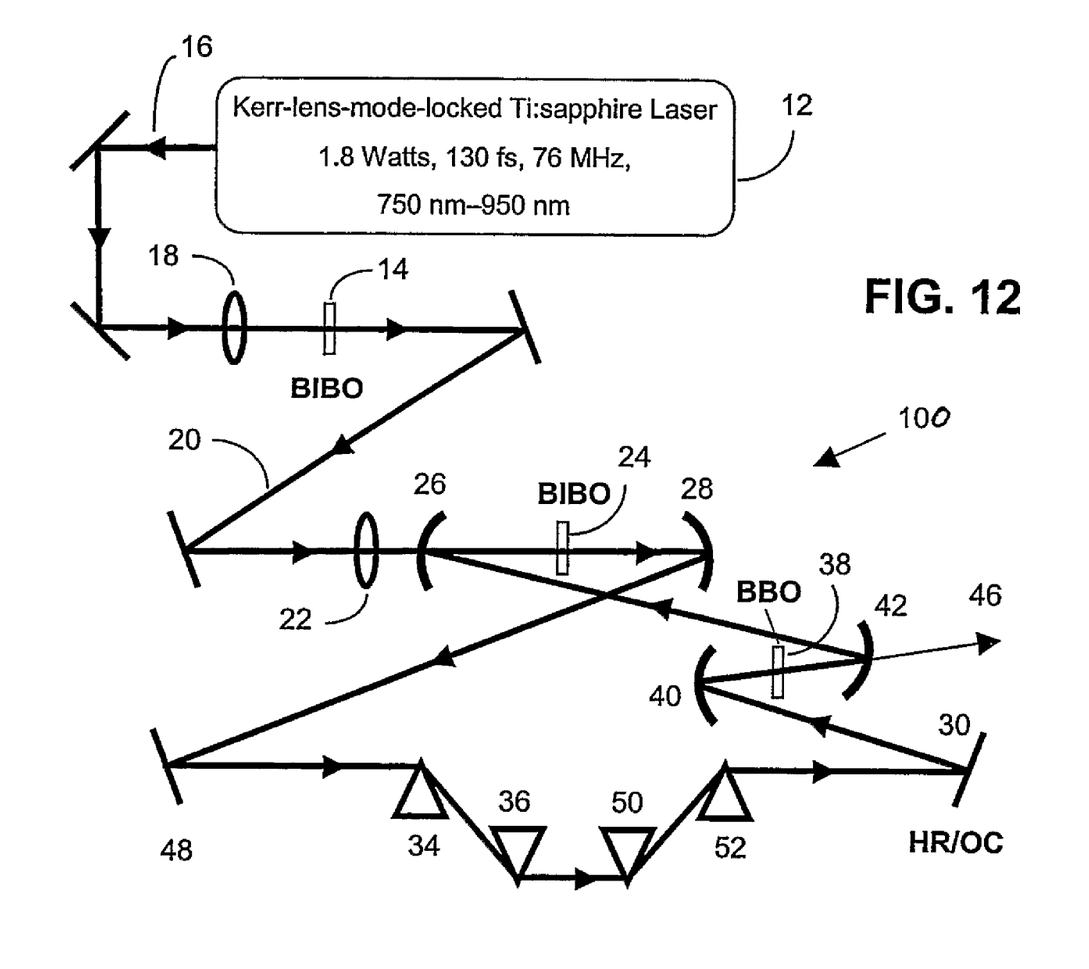
FIG. 12 is a diagram of an OPO of the second type with a modified oscillator cavity.

Although the present invention has been described in terms of two preferred embodiments illustrated in FIG. 1 and FIG. 2, it will be apparent to those of skill in the art that modifications may be made without departing from the scope thereof as set forth in the following claims. For example, some modifications of the arrangement of the oscillator cavity in the OPO 10 are shown in FIGS. 6 to 8 and some modifications of the arrangement of the oscillator cavity in the OPO 100 are shown in FIGS. 10 to 12.

Figure 6:
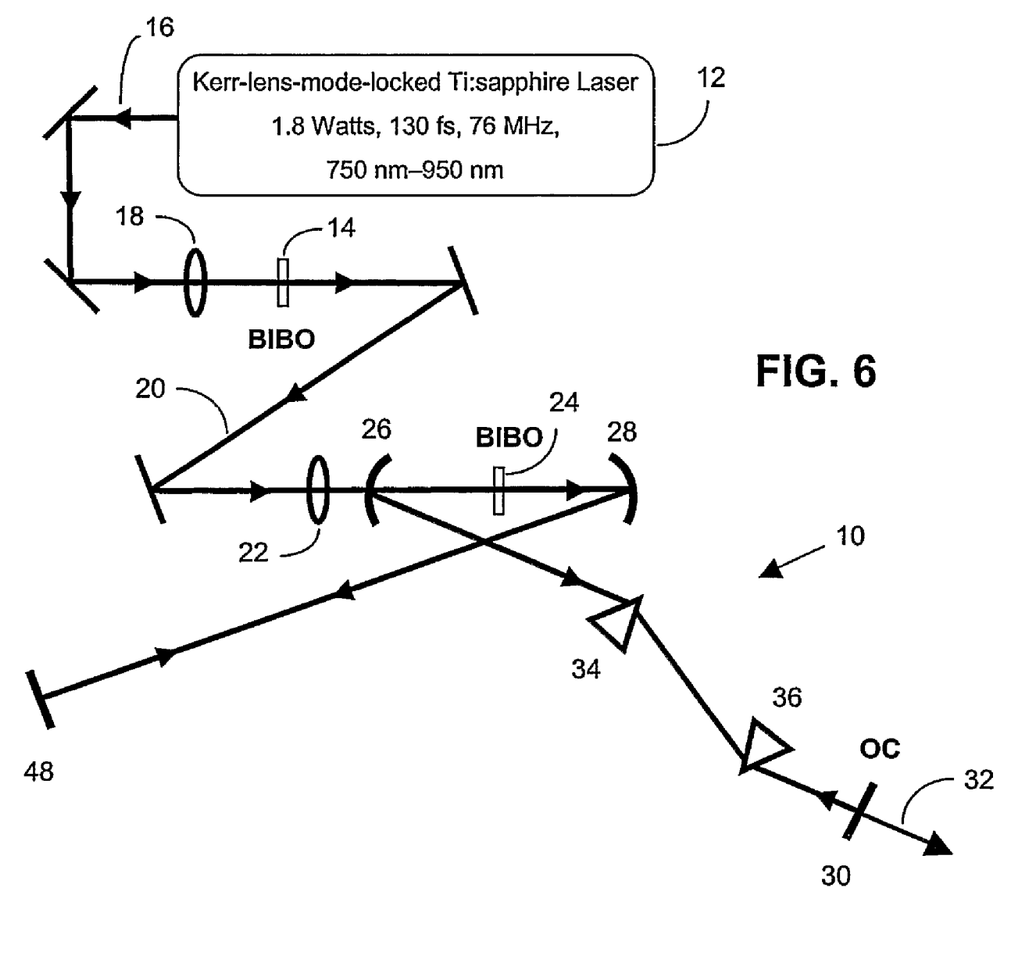
FIG. 6 is a diagram of an OPO of the first type with a modified oscillator cavity.

In the modification of FIG. 6, the oscillator cavity of the OPO 10 is additionally formed by a plane mirror 48 to have a standing-wave four-mirror X-cavity configuration.

Figure 7:
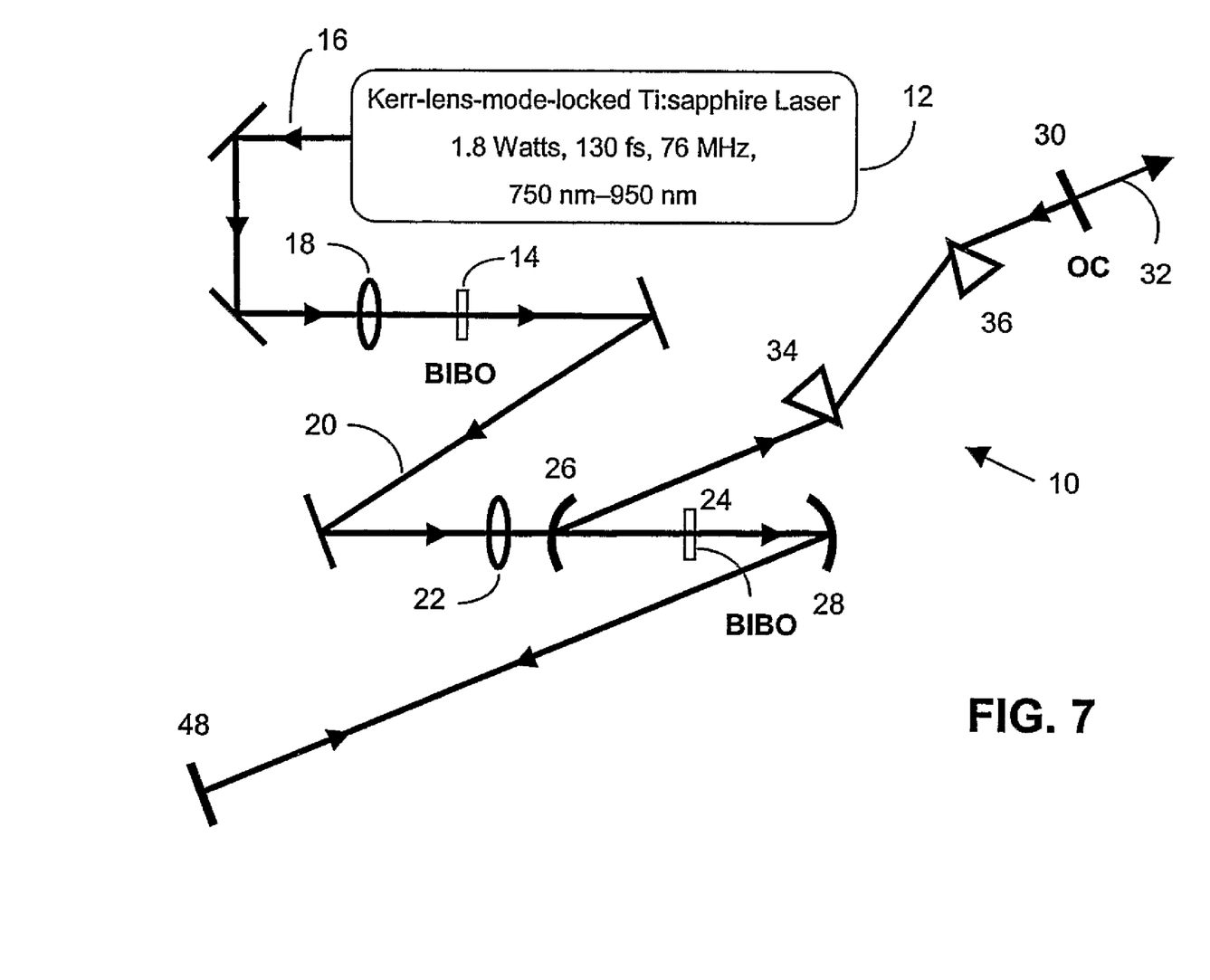
FIG. 7 is a diagram of an OPO of the first type with a modified oscillator cavity.

In the modification of FIG. 7, the oscillator cavity of the OPO 10 is additionally formed by a plane mirror 48 to have a standing-wave four-mirror Z-cavity configuration.

Figure 8:
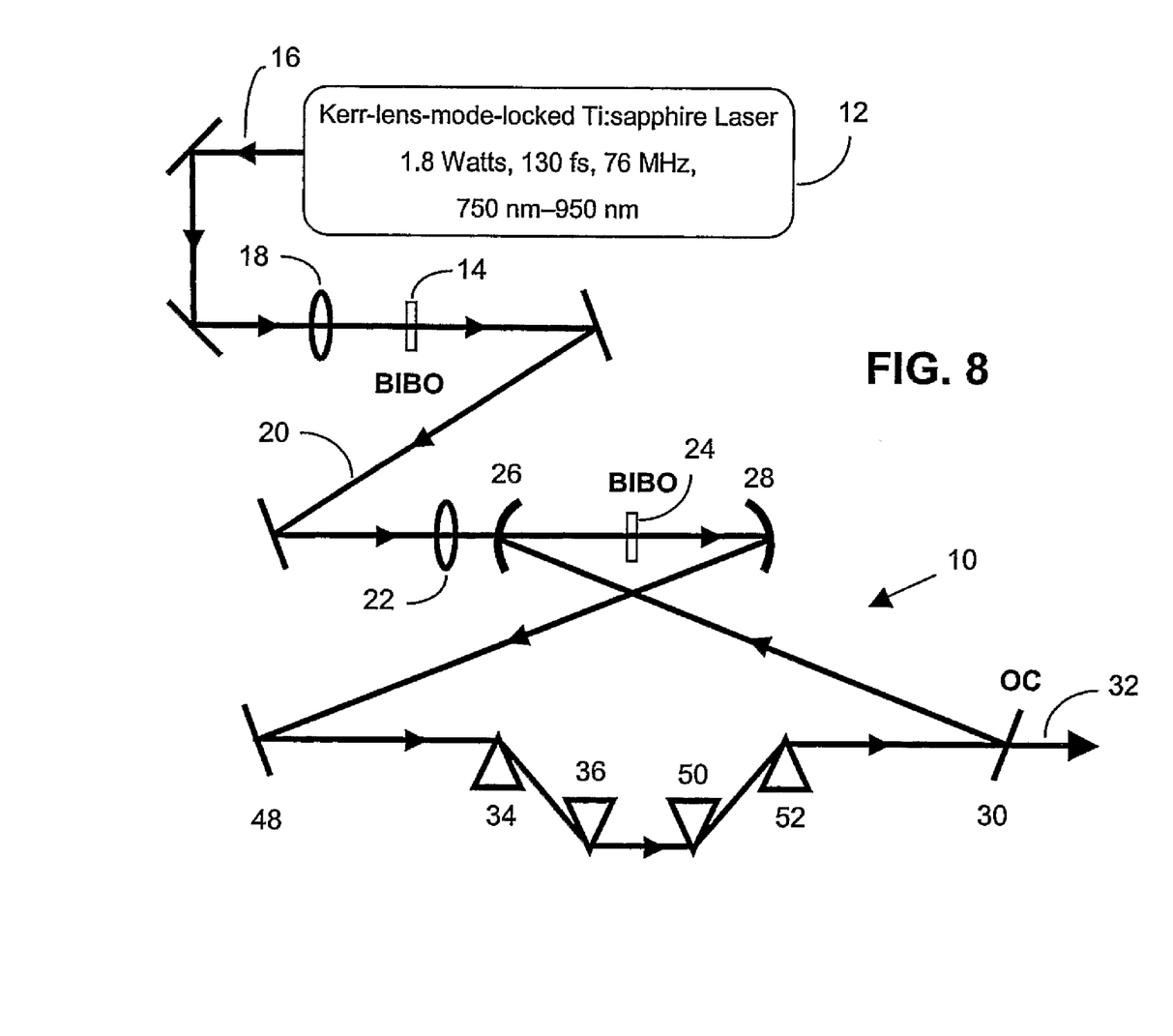
FIG. 8 is a diagram of an OPO of the first type with a modified oscillator cavity.

In the modification of FIG. 8, the oscillator cavity of the OPO 10 is additionally formed by a plane mirror 48 to have a travelling-wave 4-mirror ring-cavity configuration. Two additional two fused silica prisms 50, 52 are accommodated in the oscillator cavity providing intracavity dispersion compensation together with the two fused silica prisms 34, 36.

In the modification of FIG. 10, the oscillator cavity of the OPO 100 is additionally formed by a plane mirror 48 to have a standing-wave four-mirror X-cavity configuration.

In the modification of FIG. 11, the oscillator cavity of the OPO 100 is additionally formed by a plane mirror 48 to have a standing-wave four-mirror Z-cavity configuration.

In the modification of FIG. 12, the oscillator cavity of the OPO 100 is additionally formed by a plane mirror 48 to have a travelling-wave 4-mirror ring-cavity configuration. Two additional two fused silica prisms 50, 52 are accommodated in the oscillator cavity providing intracavity dispersion compensation together with the two fused silica prisms 34, 36.

The invention claimed is:

1. An optical parametric oscillator, comprising:
    a laser pump source operable to provide pump pulses of light of wavelength in the range from 300 nm to 500 nm, which pump pulses are of a duration of at most 500 fs and at a predetermined repetition rate of at least 0.1 MHz;
    an oscillator cavity including a first focus;
    a nonlinear optical crystal comprising either (a) BiB$_3$O$_6$ or (b) Bi$_{1-x}$M$_x$B$_3$O$_6$ where M is Ga, In, Sc or one of the rare earth elements and 0<x≦0.5, in a collinear phase-matching configuration, located at the focus of said oscillator cavity;
    the laser pump source being located external to the oscillator cavity and arranged to direct the pump pulses through said crystal to synchronously pump said crystal and thereby cause the crystal to generate signal pulses and idler pulses from the pump pulses, the oscillator cavity being arranged to direct the signal pulses along the oscillator cavity and to output output pulses derived from the signal pulses.

2. An optical parametric oscillator according to claim 1, wherein the oscillator cavity is arranged to output a proportion of the power of the signal pulses as said output pulses.

3. An optical parametric oscillator according to claim 1 wherein
    the oscillator cavity further includes a second focus,
    the optical parametric oscillator further comprises a second nonlinear optical crystal located at said second focus of said cavity, in a second-harmonic generation configuration, the second nonlinear optical crystal being arranged to generate second-harmonic pulses from the signal pulses,
    the oscillator cavity is arranged to output at least a proportion of the power of the second-harmonic pulses as said output pulses.

4. An optical parametric oscillator according to claim 3, wherein the second nonlinear optical crystal comprises β-BaB$_2$O$_4$.

5. An optical parametric oscillator according to claim 3, wherein the second nonlinear optical crystal comprises one of LiB$_3$O$_5$ or KDP.

6. An optical parametric oscillator according to claim 1, wherein the laser pump source comprises a laser operable to output laser pulses of light of wavelength in the range from 600 nm to 1500 nm and a further nonlinear optical crystal, in a harmonic generation configuration, arranged to receive the laser pulses and to generate said pump pulses from said laser pulses at a harmonic of said laser pulses.

7. An optical parametric oscillator according to claim 6, wherein the further nonlinear optical crystal is in a second-harmonic generation configuration and is arranged to generate said pump pulses from sad laser pulses at a second harmonic of said laser pulses.

8. An optical parametric oscillator according to claim 7, wherein sad laser pump source is a Ti:sapphire laser.

9. An optical parametric oscillator according to claim 8, wherein said laser pump source is operable to output laser pulses of light of wavelength in the range from 700 nm to 1000 nm.

10. An optical parametric oscillator according to claim 8, wherein said Ti:sapphire laser is Kerr-lens-mode locked.

11. An optical parametric oscillator according to claim 6, wherein said laser is an Nd-doped or Yb-doped solid state laser.

12. An optical parametric oscillator according to claim 6, wherein the further nonlinear optical crystal comprises either (a) $BiB_3O_6$ Or (b) $Bi_{1-x}M_xB_3O_6$ where M is Ga, In, Sc or one of the rare earth elements and $0 < x \leqq 0.5$.

13. An optical parametric oscillator according to claim 1, wherein the laser pump source is operable to provide pump pulses of light of wavelength in the range from 375 nm to 475 nm.

14. An optical parametric oscillator according to claim 1, wherein the laser pump source is operable to provide pump pulses at a predetermined repetition rate of at least 1 MHz.

* * * * *